United States Patent
Jahagirdar

(10) Patent No.: US 12,488,352 B2
(45) Date of Patent: Dec. 2, 2025

(54) CONTROLLING ACCESS TO RESOURCE SYSTEMS BASED ON USER PROFILE MODIFICATIONS

(71) Applicant: Truist Bank, Charlotte, NC (US)

(72) Inventor: Prasad P. Jahagirdar, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 139 days.

(21) Appl. No.: 18/612,613

(22) Filed: Mar. 21, 2024

(65) Prior Publication Data
US 2025/0300989 A1 Sep. 25, 2025

Related U.S. Application Data

(63) Continuation of application No. 18/612,407, filed on Mar. 21, 2024.

(51) Int. Cl.
*G06Q 20/40* (2012.01)
*H04L 9/40* (2022.01)

(52) U.S. Cl.
CPC ....... *G06Q 20/4016* (2013.01); *H04L 63/102* (2013.01); *H04L 63/104* (2013.01); *H04L 63/105* (2013.01); *H04L 63/123* (2013.01)

(58) Field of Classification Search
CPC ... H04L 63/102; H04L 63/104; H04L 63/105; H04L 63/106; H04L 63/107; H04L 63/123; H04L 63/126
USPC .......................................... 709/220, 224–229
See application file for complete search history.

(56) References Cited

U.S. PATENT DOCUMENTS

| | | | |
|---|---|---|---|
| 10,142,328 B1* | 11/2018 | Barrasso | H04L 63/083 |
| 10,685,398 B1* | 6/2020 | Olson | G06Q 20/209 |
| 2014/0279526 A1* | 9/2014 | Jackson | G06Q 20/381 705/44 |
| 2018/0158049 A1* | 6/2018 | Jackson | G06Q 20/023 |
| 2020/0058032 A1* | 2/2020 | Lad | G06V 40/1365 |
| 2021/0224788 A1* | 7/2021 | Kurylko | G06Q 20/3552 |
| 2021/0224799 A1* | 7/2021 | Ongpin | H04L 63/083 |
| 2021/0292825 A1* | 9/2021 | Rothberg | B01L 3/5029 |

(Continued)

FOREIGN PATENT DOCUMENTS

| | | | | |
|---|---|---|---|---|
| CA | 2741437 A1 * | 4/2010 | ......... | G06Q 30/0254 |
| CA | 2906834 A1 * | 9/2014 | ......... | G06Q 20/3821 |
| CA | 3124437 A1 * | 6/2019 | ....... | G06Q 20/40145 |

*Primary Examiner* — Khanh Q Dinh
(74) *Attorney, Agent, or Firm* — Kilpatrick Townsend & Stockton LLP; Michael A. Springs, Esq.

(57) ABSTRACT

A system can be provided for automatically enrolling and unenrolling user accounts in and from resource systems. For example, the system can receive an enrollment request from a user device. In response, the system can request a mobile communication from a piece of contact data of a user profile associated with the user account. Upon receiving the mobile communication, the system can verify a user of the user account and automatically enroll the user account in the resource system to provide access for the user account to the resource system. Subsequent to enrolling the user account in the resource system, the system can monitor the user profile to detect a modification to the piece of contact data in the user profile. Upon detecting the modification, the system can prevent the access for the user account to the resource system for a period of time.

17 Claims, 3 Drawing Sheets

(56) References Cited

U.S. PATENT DOCUMENTS

2021/0365947 A1* 11/2021 Benkreira .......... G06Q 20/4015
2022/0272084 A1*  8/2022 Hyatt .................... H04W 12/06
2022/0375259 A1* 11/2022 Banerjee ................ G06V 40/45

* cited by examiner

CONTROLLING ACCESS TO RESOURCE SYSTEMS BASED ON USER PROFILE MODIFICATIONS

CROSS-REFERENCE TO RELATED APPLICATION

This application is a continuation of U.S. patent application Ser. No. 18/612,407 filed Mar. 21, 2024, and titled "CONTROLLING ACCESS TO RESOURCE SYSTEMS BASED ON USER PROFILE MODIFICATIONS," the content of which is incorporated herein by reference.

TECHNICAL FIELD

The present disclosure relates generally to secure resource transfers and, more particularly (although not necessarily exclusively), to controlling access to resource systems based on user profile modifications.

BACKGROUND

Resource systems may facilitate transfers of resources. Examples of the resource systems may include mobile banking applications, Automated Clearing House, online payment services (e.g., Zelle), peer-to-peer payment systems (e.g., Apple Pay), wire transfer channels, or the like. In some examples, the resource systems can be used for performing data (e.g., electronic fund) transfers between user accounts associated with one or more entities (e.g., financial institutions). Additionally, user profiles can be associated with the user accounts, and users can be authenticated based on information in the user profiles. For example, authentication with a user account can enable a user (e.g., an external client of the entity) to monitor data transfers performed via one or more resources systems with respect to the user account, initiate the data transfers, or perform other suitable operations.

SUMMARY

According to one example of the present disclosure, a system can include a processor and a memory including instructions that are executable by the processor to perform operations. The operations can include receiving an enrollment request from a user device, the enrollment request being a request to enroll a user account in a resource system; in response to receiving the enrollment request, requesting a mobile communication from a piece of contact data of a user profile associated with the user account; upon receiving the mobile communication, verifying a user of the user account and automatically enrolling the user account in the resource system, wherein enrolling the user account in the resource system provides access for the user account to the resource system; subsequent to enrolling the user account in the resource system, monitoring the user profile to detect a modification to the piece of contact data in the user profile; and upon detecting the modification to the piece of contact data, preventing the access for the user account to the resource system for a period of time.

According to another example of the present disclosure, a non-transitory computer readable medium may contain instructions that are executable by a processor to cause the processor to perform operations. The operations can include receiving an enrollment request from a user device, the enrollment request being a request to enroll a user account in a resource system; in response to receiving the enrollment request, requesting a mobile communication from a piece of contact data of a user profile associated with the user account; upon receiving the mobile communication, verifying a user of the user account and automatically enrolling the user account in the resource system, wherein enrolling the user account in the resource system provides access for the user account to the resource system; subsequent to enrolling the user account in the resource system, monitoring the user profile to detect a modification to the piece of contact data in the user profile; and upon detecting the modification to the piece of contact data, preventing the access for the user account to the resource system for a period of time.

According to a further example of the present disclosure, a computer-implemented method can involve receiving an enrollment request from a user device, the enrollment request being a request to enroll a user account in a resource system; in response to receiving the enrollment request, requesting a mobile communication from a piece of contact data of a user profile associated with the user account; upon receiving the mobile communication, verifying a user of the user account and automatically enrolling the user account in the resource system, wherein enrolling the user account in the resource system provides access for the user account to the resource system; subsequent to enrolling the user account in the resource system, monitoring the user profile to detect a modification to the piece of contact data in the user profile; and upon detecting the modification to the piece of contact data, preventing the access for the user account to the resource system for a period of time.

DETAILED DESCRIPTION

Figure 1:
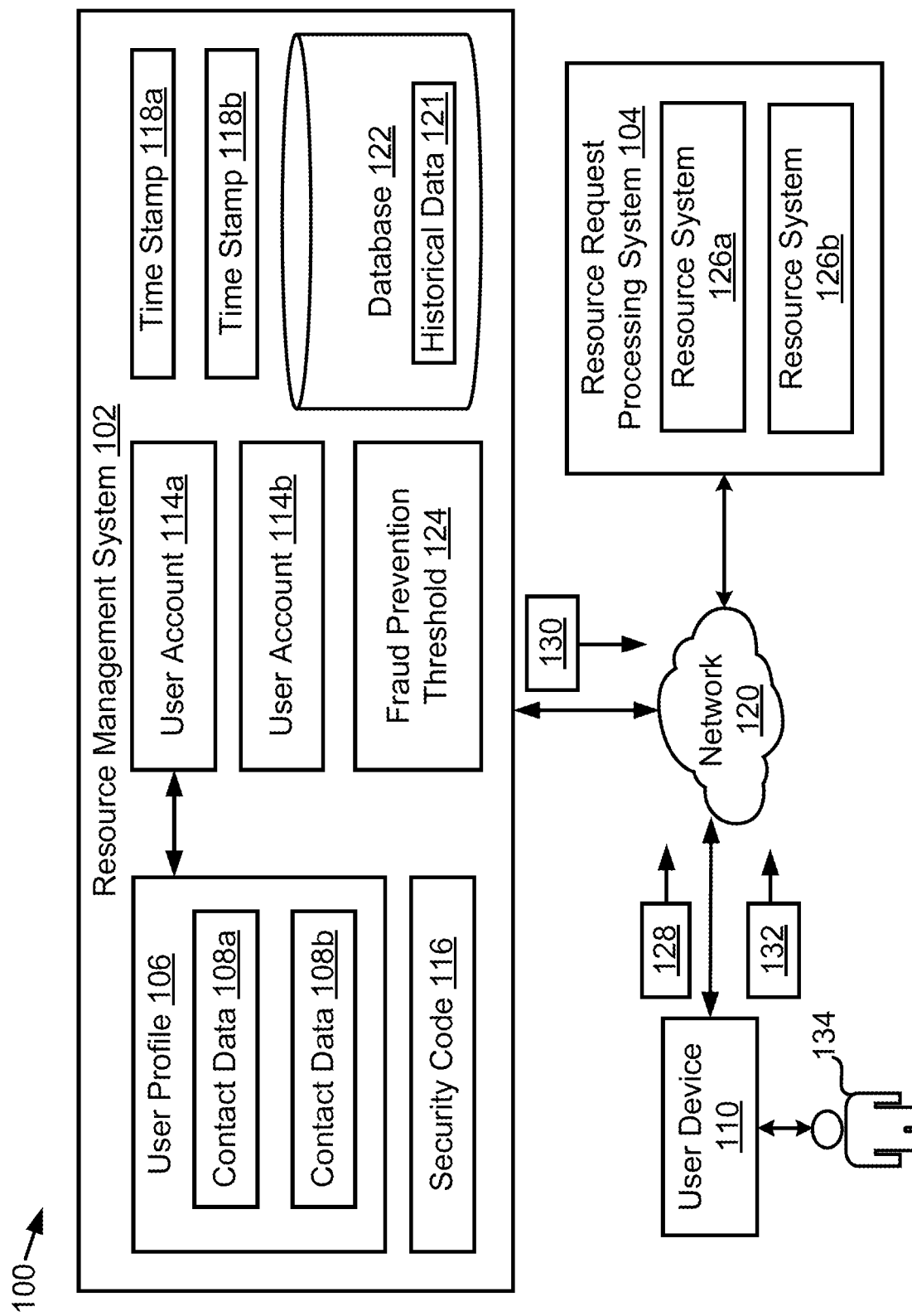
FIG. 1 is a block diagram of an example of a computing environment for controlling access to resource systems based on user profile modifications according to some embodiments of the present disclosure.

Certain aspects and examples of the present disclosure relate to controlling access to resource systems based on user profile modifications. For example, in one aspect, a system can detect a modification to a piece of contact data in a user profile. The modification may involve an addition or change to an email, phone number, or other suitable type of contact data. After detecting the modification to the piece of contact data, the system can monitor for resource requests. For example, a resource request can be a request to allocate or transfer a resource (e.g., data) between user accounts. In a particular example, the resource request can be a request for a secure transfer of data (e.g., funds or other suitable data) from a user account associated with the user profile (e.g., a checking account) to a second user account. A resource request can be scheduled, executed, or a combination thereof via a resource system. Thus, in response to detecting the modification to the piece of contact data, the system can allow or prevent access to the resource system, execution of the resource request by the resource system, or a combination thereof.

For example, upon receiving a resource request, the system can determine whether there has been a previous transfer of data between the user account associated with the user profile and the second user account. If there has been a transfer of data between the accounts, the resource request can be approved and resource transfer corresponding to the resource request can be executed by a resource system (e.g., automated clearing house (ACH), wire transaction, Zelle, or the like). That is, the transfer of data between the user accounts can be executed. If there has not been a transfer of data between the accounts, the system can perform further analysis. For example, the system can compare a time the system detected the modification to the contact data to a time the system received the resource request. If a difference between the times is less than a threshold, the system can deny the request (e.g., by preventing the resource request from being forwarded to or processed at the resource system), thereby preventing the transfer of data between the user accounts. Additional or alternatively, the system may request a security code transmitted via contact data that was in the user profile prior to the modification. In contrast, if the difference between the times is greater than the threshold, the system can approve the resource request.

In some examples, after a modification to contact data in a user profile, the modified contact data may be used to access a user account associated with the user profile, initiate a transfer of data from the user account, or perform other suitable actions. However, enabling actions to be performed with respect to a user account using modified contact data may render the user account vulnerable to security breaches, which can result in loss of data, unauthorized data usage, and a reduction in data integrity. The security breaches can also result in latency for systems which facilitate resource (e.g., data) transfers and maintenance (e.g., resource systems). For example, if an unauthorized entity breaches a user profile, modifies contact data in the user profile, and subsequently accesses an associated user account, data stored in the user account may be transferred to another account or otherwise tampered with. To counteract the security breach, a resource system (e.g., the system through which the data was fraudulently transferred) may perform a resource transfer reversal in an attempt to return the data to the user account. However, the resource transfer reversal may disrupt normal operations of the resource system, thereby increasing latency for the resource system. Additionally, when contact data is modified, an alert for notifying an authorized user of the user account of a potential security threat may be transmitted via the modified contact data. Consequently, the alert may not be received at a user device belonging to the authorized user.

Examples of the present disclosure can overcome one or more of the above-mentioned problems via the system that can control access to resource systems based on user profile modifications. In some examples, the system may detect contact data modifications and subsequently deny access to a resource system to prevent unauthorized data transfers. For example, when an unauthorized entity breaches a user profile and modifies contact data in the user profile, the system can prevent access of a user account associated with the user profile to resource systems for a period of time. In doing so, the system can block attempts to transfer data from the user account to unknown user accounts (e.g., user accounts to which the user account associated with the user profile has not previously transferred data) via the resource systems. To block attempts to transfer data, the system can transmit an alert to contact data that was associated with the user profile before modification. The alert can notify an authorized user of the user account of the contact data modification or of a resource request transmitted after the contact data modification. The alert can further prevent a resource request from being processed at a resource system. That is, the alert can prevent a transfer of data from being executed by the resource system.

Thus, the system can prevent a fraudulent or unauthorized data transfers from being performed during the period of time. This can allow time for a user (e.g., an account holder) of the user account to be notified of and to correct the unauthorized contact data modification. By preventing unauthorized data transfers, the system can minimize or prevent the loss of data, unauthorized data usage, and the reduction in data integrity. Moreover, the system can act as a protective layer to prevent unauthorized resource requests from being transmitted to or processed at resource systems, thereby preventing potentially fraudulent data transfers at resource systems. Thus, resource transfer reversals may not be performed, which can reduce latency for the resource systems.

In another aspect, the system can facilitate automatic enrollment and unenrollment of user accounts from resource systems. The resource systems can be the systems which facilitate the transfer of data (e.g., funds) between user or entity accounts. To transfer data to or from a user account via a particular resource system, the user account may have to be enrolled in the particular resource system. To enroll an account, a user can submit an enrollment request via, for example, a software application or web interface. The software application or web interface can be associated with an entity (e.g., a financial institution) that hosts the user account being enrolled. The system can receive the enrollment request, access a user profile associated with the user account, and authenticate a user of the user account using contact data or other suitable information in the user profile. Upon authenticating the user, the system can automatically enroll the user account in the resource system. Conversely, if a user wishes to close a user account, the user can submit a termination request. The system can then detect the user account closure and automatically unenroll the user account from one or more resource systems.

Methods for enrolling user accounts in or unenrolling user accounts from resource systems may be manual and therefore inefficient. For example, systems can require a user go to a location (e.g., an office or branch location) associated with the entity hosting the user account to request enrollment of the user account in a resource system (e.g., Automated Clearing House (ACH)). Similarly, when a user closes a user account, the user account can continue to be enrolled and stored by the resource system unless manually removed by an internal user (e.g., an employee) of the entity hosting the user account. As a result of storing closed user accounts, there can be an inefficient use of computing resources at the resource systems. For example, storing closed user accounts can consume storage, memory, and processing power, which may negatively impact (e.g., by causing latency in) the resource system's ability to process resource requests.

Some examples of the present disclosure can overcome one or more of the above-mentioned problems using a system that automates enrollment and unenrollment of user accounts. For example, by automating the authentication of users and subsequent enrollment of user accounts in resource systems, users are not required to perform in person authentication. Additionally, by automating unenrollment and enrollment of user accounts in resource systems, computing resource costs associated with the current methods can be reduced. For example, by removing closed user accounts from enrollment in the resource systems, storage, memory, and processing power at the resource systems can be used efficiently. As a result, performance at the resource systems can be improved. For example, the resource systems may process or perform resource requests faster. Furthermore, the automation can improve the scalability of the resource systems as user accounts can efficiently be added to and removed from the resource systems.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for controlling access to resource systems based on user profile modifications according to some embodiments of the present disclosure. The computing environment 100 can include a resource management system 102, which can be in communication with one or more user devices 110 and a resource request processing system 104 via a network 120. Examples of the network 120 can include a local area network (LAN) or the Internet.

In some examples, the computing environment 100 may be a distributed computing environment, such as a cloud computing system, an IoT computing platform, or a computing cluster, formed from one or more nodes (e.g., physical or virtual servers) that are in communication with one another via a network 120. Additionally, in some examples, the computing environment 100 can be formed from a physical infrastructure that includes various network hardware, such as routers, hubs, bridges, switches, and firewalls. The physical infrastructure can also include one or more servers. The servers may provide backend support for a software application (e.g., a mobile application) or a web interface for enabling a user 134 to transmit requests to the resource request processing system 104, the resource management system 102, or a combination thereof.

In an example, the user 134 may establish a user account 114a with an entity. The user account 114a may be of any suitable type of account. For example, the entity may be a bank and the user account 114a may be a checking account, a savings account, or the like. Separately from establishing the user account 114a, the user 134 may register a user profile 106 with the entity for use in authenticating with, monitoring, or performing actions with respect to an associated user account 114a. The user 134 may then link the user profile 106 to the underlying user account 114a hosted by the entity. The user 134 can also register the user profile 106 with one or more user devices (e.g., user device 110). Examples of the user devices can include mobile phones, laptops, tablets, smart watches, etc. Additionally or alternatively, the user 134 can provide contact data 108a-b (e.g., an email address and phone number) and personal data (e.g., full legal name, address, employment information, etc.), which can be stored in the user profile 106.

As a result of registering the user profile 106 with the user device 110, the user 134 may obtain access to the user account 114a via a software application executing on user device 110 or via a web interface. In some examples, prior to enabling the user 134 to access the user account 114a, verification of the user's 134 identity can be performed using the contact data 108a-b. For example, a one-time password or security code may be transmitted via the phone number stored in the user profile 106. The user 134 may then be required to provide the one-time password or security code via the software application or web interface to verify their identity and receive access to the user account 114a. Upon receiving access to the user account 114a, the user 134 can initiate data transfers, which may be transmitted from the user account 114a to another user account via a resource system (e.g., Automated Clearing House (ACH), wire transfer, or the like).

In some examples, to transfer data via resource systems 126a-b, the user account 114a may have to be enrolled in the resource systems 126a-b. To enroll the user account 114a, the user device 110 can transmit an enrollment request 128 to the resource management system 102. For example, the user device 110 may submit the enrollment request 128 in response to the user 134 initiating or submitting a request to enroll the user account 114a in a first resource system 126a via the software application or web interface. The resource management system 102 may perform various functions, including but not limited to, supervising access too and data transfers by various resource systems. After receiving the enrollment request 128, the resource management system 102 can verify that the enrollment request 128 was submitted by the user 134 associated with the user account 114a by transmitting a security code 116 (e.g., a string of letters, numbers, or a combination thereof) to a piece of contact data (e.g., the phone number) associated with the user profile 106. At the same time, the resource management system 102 can transmit a push notification to the user device 110 with which the user 134 can enter the security code 116. Alternatively, the resource management system 102 can verify the user 134 by requesting a mobile communication or electronic mail from a piece of contact data associated with the user profile 108. Upon receiving the security code or communication from the piece of contact information, the resource management system 102 can verify the user 134 and automatically enroll the user account 114a in the resource system 126a (e.g., ACH).

Additionally, in some examples, the contact data 108a-b of the user profile 106 can be modified. In a particular example, the user profile 106 can include a first piece of contact data 108a, which can be a primary phone number and a second piece of contact data 108b, which can be a secondary phone number. In the particular example, the modification can be to the second piece of contact data 108b and can therefore be a change to the secondary phone number of the user profile 106.

The resource management system 102 can detect the modification to the second piece of contact data 108b. In response, the resource management system 102 can prevent data transfers to unfamiliar accounts (e.g., user accounts which the first user account 114a has not previously transferred data to) for a period of time following the modification to the second piece of contact data 108b. In this way, the resource management system 102 can minimize a risk of fraudulent access to the user account 114a and of unauthorized data transfers. For example, if the modification to the second piece of contact data 108b was not authorized by the user 134 associated with the user account 114a, the modified contact data cannot be used to initiate a fraudulent data transfer in the time period. However, during the time period following the modification, data transfers to familiar user accounts (e.g., user accounts which the first user account 114a has previously received data from or transferred data to) can be performed. Thus, security for the user account 114a can be enhanced without interfering with the familiar or typical data transfers performed with respect to the user account 114a.

In the particular example, subsequent to detecting the modification to the second piece of contact data 108b, the resource management system 102 can receive a resource request 132 from the user device 110. The resource request 132 can be a request for a transfer of data from the first user account 114a to a second user account 110b. The resource request 132 can specify that the resource system 126a is to be used for the data transfer. Additionally or alternatively, the resource request 132 can be a request to add a recipient to a resource system (e.g., Zelle). Once the recipient (e.g., the second user account 114b) is added to the resource system, a data transfer can be performed without a secondary request to the resource management system 102.

In response to receiving the resource request 132, the resource management system 102 can determine whether there has been a previous transfer of data between the first user account 114a and the second user account 110b. To do so, the resource management system 102 may access a database 122. The database 122 can store historical data 121 relating to historical data transfers received or transmitted by the first user account 114a. In some examples, the database 122 may store historical data 121 relating to historical data transfers for a certain timeframe (e.g., from the previous 1, 3 or 5 years). The historical data 121 for each historical data transfer can include, for example, an account or entity (e.g., a company or user account) the data was transmitted to or received from, an amount or type of the data transferred, a resource system or channel (e.g., ACH, wire transfer, etc.) through which the data transfer was performed, or other suitable information. Thus, in the particular example, the resource management system 102 may determine, based on the historical data 121 in the database 122, that there has not been a transfer of data between the first user account 114a and the second user account 114b within the certain timeframe (e.g., previous 3 years).

In response to determining that there has not been a previous transfer of data, the resource management system 102 can determine a first time associated with the modification to the second piece of contact data 108b. For example, the resource management system 102 can retrieve (e.g., access or record) a first time stamp 118a corresponding to the modification of the second piece of contact data 108b. Similarly, the resource management system 102 can determine a second time associated with the resource request 132. For example, the resource management system 102 can retrieve (e.g., access or record) a second time stamp 118b. In some examples, the second time stamp 118b can correspond to a time at which a user submitted the resource request 132, such as via the software application or web interface. In other examples, the second time stamp 118b can correspond to a time at which the resource management system 102 received the resource request. The resource management system 102 can then compare a difference between the second time and the first time to a fraud prevention threshold 124. The fraud prevention threshold can be a duration of time (e.g., 72 hours).

In some examples, the fraud prevention threshold 124 can be predefined. In other examples, the fraud prevention threshold 124 can be a dynamic value determined based on a type of contact data modified, a level of similarity of the modified contact data to other contact data in the user profile, a level of similarity of the modified contact data to the piece of contact data before modification, whether other contact data has been modified within a recent time frame, etc. For example, if the secondary phone number, after modification, has the same area code as the primary phone number, the secondary phone number before modification, or a combination thereof, the fraud prevention threshold 124 can be less than if the area codes did not match. In another example, some types of contact data (e.g., a phone number or email) can be associated with a greater fraud prevention threshold than other types of contact data (e.g., a work or home address). The fraud prevention threshold 124 can further be based on the resource request 132. For example, the fraud prevention threshold 124 can be greater for a request to transfer an amount of data (e. funds) exceeding a threshold (e.g., $500).

Additionally, in some examples, a machine learning model can be trained to output the fraud prevention threshold 124 based on the contact data in the user profile, the modification to the piece of contact data, the resource request, or a combination thereof. For example, the machine learning model can be trained on a dataset comprising contact data modifications, resource requests, or a combination thereof and corresponding fraud prevention thresholds. Thus, after training, the machine learning model can output fraud prevention thresholds. By using the machine learning model or otherwise dynamically generating the fraud prevention threshold, the fraud prevention threshold can reflect a likelihood of a security threat to the user account. Thus, security for the first user account 114a and the resource systems 126a-b can be optimized.

In the particular example, the resource management system 102 can determine that the difference between the second time and the first time is less than the fraud prevention threshold 124. Due to the difference being less than the fraud prevention threshold 124 and because there has not been a previous transfer of data between the first user account 114a and the second user account 114b, the resource management system 102 can deny the resource request 132. In the particular example, denying the resource request 132 can involve the resource management system 102 preventing the data transfer between the first user account 114a and the second user account 114b by preventing the resource request 132 from being forwarded to, processed at, and executed by the resource system 126a. Additionally, in some examples, denying the resource request 132 can involve the resource management system 102 preventing the addition of the recipient to the resource system 126a.

The resource management system 102 can further transmit an alert 130 to the user device 110 associated with the first user account 114a. The resource management system 102 may transmit the alert 130 using the first piece of contact data 108a that was not modified and that was included in the user profile 106 prior to the modification of the second piece of contact data 108a. Thus, the alert 130 can be a message transmitted to the primary phone number associated with the user profile 106 that includes information regarding the modification to the second piece of contact data 108b, the resource request 132, or a combination thereof. In this way, if the resource request 132 was an unauthorized request, the data transfer can be prevented and the user 134 associated with the user account 114a can be notified of the unauthorized request.

Additionally, subsequent to denying the resource request 132, the resource management system 102 may transmit a security code 116 to the user device 110. For example, the security code 116 can be transmitted via a push notification or via a message to the primary phone number. Then the security code 116 can be included in a second resource request transmitted to the resource management system 102. Based on the security code 116 being included in the second resource request, the resource management system 102 can approve the second resource request and forward the resource request to a resource request processing system 104. The resource system 126a can be part of the resource request processing system 104 and can perform the transfer of data from the first user account 114a to the second user account 114b. In this way, the security code can enable an authorized transfer of data to an unfamiliar user account to be performed following the modification to the second piece of contact data 108b.

In another example, the resource management system 102 may receive another resource request for transfer of data from the first user account 114a to the second user account 114b. The resource request can specify that the transfer of data should be through a second resource system 126b (e.g., a wire transfer channel). As discussed above, the resource management system 102 can determine, based on the database 122, that there has not been a previous transfer of data between the first user account 114a and the second user account 114b. As a result, the resource management system 102 can detect a time at which the resource request was received and can compare the time to the time of the modification to the second piece of contact data 108b. The resource management system 102 may determine that the difference between the time the resource request was received and the time of the modification to the second piece of contact data 108b is greater than the fraud prevention threshold 124 (e.g., greater than 48 hours). As a result, the resource management system 102 can approve the resource request and can forward the resource request to the resource request processing system 104. At the resource request processing system 104 the data can be transferred from the first user account 114a to the second user account 114b via the second resource system 126b. The resource management system 102 can also transmit an alert to the user device that includes an indication of the approval of the resource request.

In yet another example, subsequent to the modification to the second piece of contact data 108b, the resource management system 102 can receive an additional resource request. The additional resource request can be a request for a transfer of data from the first user account 114a to a third user account. The resource management system 102 can determine, based on the historical data 121 in the database 122, that there has been a previous transfer of data from the first user account 114a to the third user account. In response to determining that there has been a previous transfer of data, the resource management system 102 can approve the resource request, forward the resource request to the resource request processing system 104, and transmit an alert including an indication of the approval of the resource request to the user device 110.

Additionally, in some examples, the first user account 114a may be closed. After the first user account 114a is closed, it may not be possible to transfer data to or receive data from the first user account 114a via the resource systems 126a-b in which the first user account 114a is enrolled. However, after the first user account 114a is closed, the first user account 114a may still be enrolled in the resource systems 126a-b and, as a result, the user 134 associated with the first user account 114a may be charged fees associated with enrollment in the resource systems 126a-b. To prevent such undesirable charges, the resource management system 102 can detect that the first user account 114a has been closed and can automatically unenroll the first user account 114a from the resource systems 126a-b. The resource management system 102 can also transmit a notification to the user device 110 to notify the user 134 of the user device 110 that the first user account 114a has been unenrolled from the resource systems 126a-b.

Figure 2:
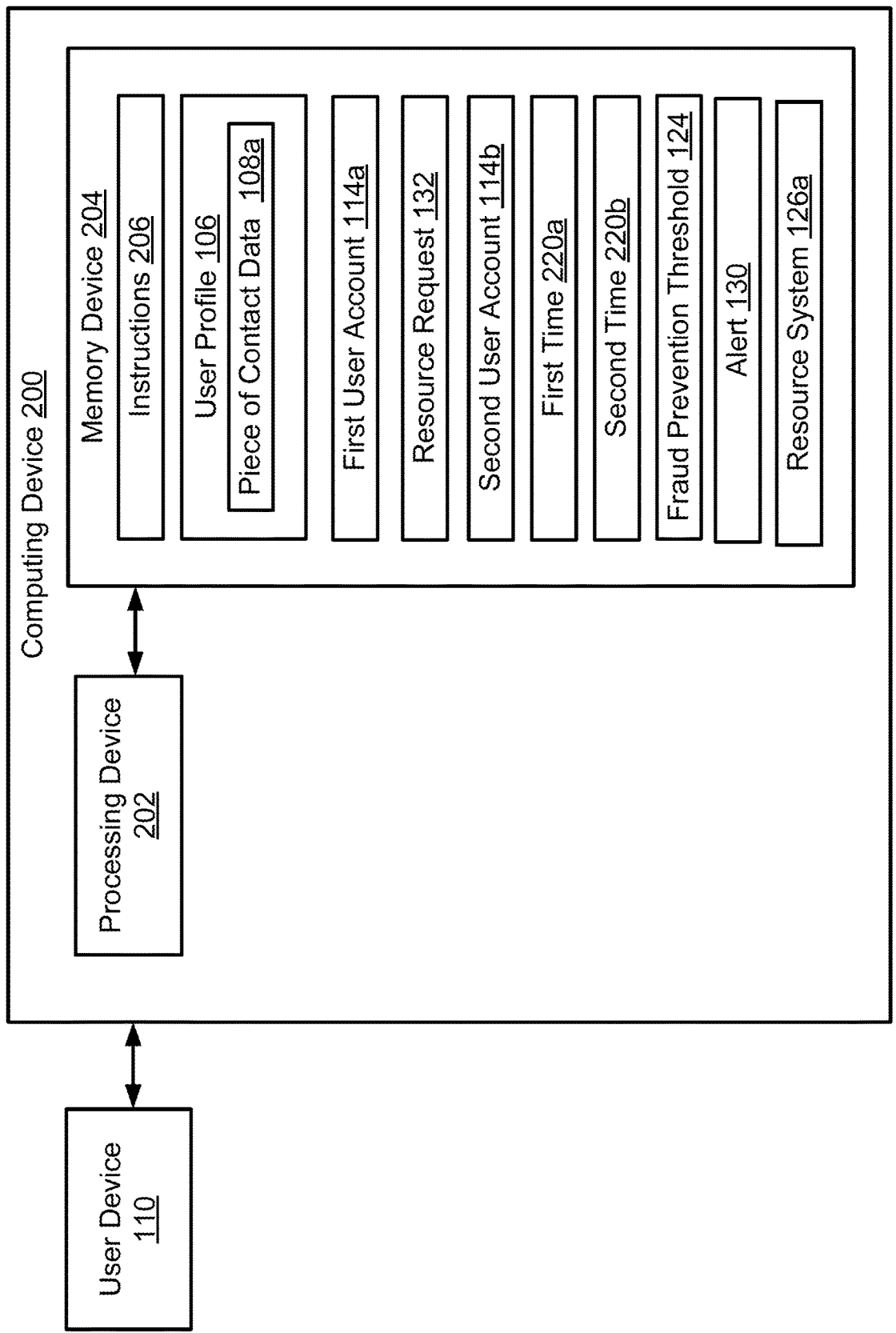
FIG. 2 is a block diagram of an example of a computing device for controlling access to resource systems based on user profile modifications according to some embodiments of the present disclosure.

FIG. 2 is a block diagram of an example of a computing device 200 for controlling access to resource systems based on user profile modifications according to some embodiments of the present disclosure. As depicted, the computing device 200 may include a processing device 202 communicatively coupled to a memory device 204. In some examples, the components shown in FIG. 2 can be integrated into a single structure. For example, the components can be within a single housing. In other examples, the components shown in FIG. 2 can be distributed (e.g., in separate housings) and in electrical communication with each other.

The processing device 202 can execute one or more operations for implementing some examples. The processing device 202 can execute instructions 206 stored in the memory device 204 to perform the operations. The processing device 202 can include one processing device or multiple processing devices. Non-limiting examples of the processing device 202 include a Field-Programmable Gate Array ("FPGA"), an application-specific integrated circuit ("ASIC"), a microprocessor, etc. In some examples, the instructions 206 can include processor-specific instructions generated by a compiler or an interpreter from code written in any suitable computer-programming language, such as C, C++, C #, Python, or Java.

The memory device 204 can include one memory or multiple memories. The memory device 204 can be non-volatile and may include any type of memory that retains stored information when powered off. Non-limiting examples of the memory device 204 include electrically erasable and programmable read-only memory (EEPROM), flash memory, or any other type of non-volatile memory. At least some of the memory device 204 can be a non-transitory, computer-readable medium from which the processing device 202 can read the instructions 206. A computer-readable medium can include electronic, optical, magnetic, or other storage devices capable of providing the processing device 202 with computer-readable instructions or other program code. Non-limiting examples of a computer-readable medium include magnetic disk(s), memory chip(s), ROM, random-access memory (RAM), an ASIC, a configured processor, optical storage, or any other medium from which the processing device 202 can read the instructions 206.

The processing device 202 can execute the instructions 206 to perform operations. For example, the processing device 202 can detect a modification to a piece of contact data 108a of a user profile 106. The user profile 106 can be associated with a first user account 114a. The processing device 202 can further receive a resource request 132, which can be a request to transfer data from the first user account 114a to a second user account 114b via a resource system 126a. The processing device 202 can also determine that there has not been a previous transfer of data from the first user account 114a to the second user account 114b. Then, based on determining that there has not been a previous transfer of data, the processing device 202 can determine a first time 220a associated with the modification to the piece of contact data 108a and determine a second time 220b associated with the resource request 132. The processing device 202 can compare a difference between the second time 220b and the first time 220a to a fraud prevention threshold 124. The fraud prevention threshold 124 can be a duration of time. Additionally, based on the difference between the second time 220b and the first time 220a being less than the fraud prevention threshold 124, the processing device 202 can generate an alert 130, which can include an indication of the modification to the piece of contact data 108a, and can transmit the alert 130 to a user device 110. The alert 130 can be transmitted using a second piece of contact data 108b that was in the user profile 106 before the modification to the first piece of contact data 108a. Additionally, the alert can prevent execution of the transfer of data at the resource system 126a.

Figure 3:
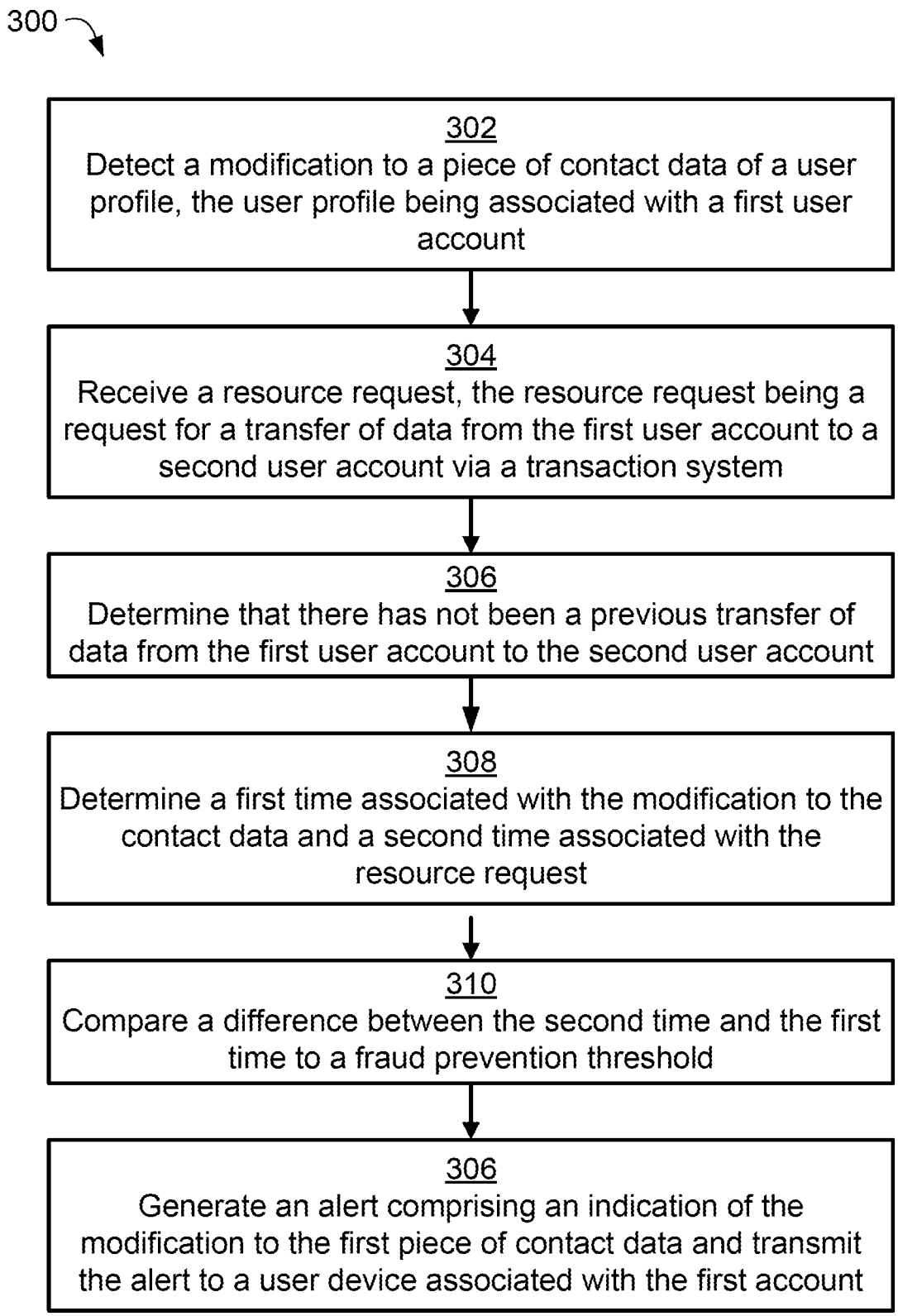
FIG. 3 is a flowchart of an example of a process for controlling access to resource systems based on user profile modifications according to some embodiments of the present disclosure.

FIG. 3 is a flowchart of an example of a process 300 for controlling access to resource systems based on user profile modifications according to some embodiments of the present disclosure. The process 300 can be implemented by the resource management system 102 of FIG. 1 or the computing device 200 of FIG. 2, but other implementations are also possible. While FIG. 3 depicts a certain sequence of steps for illustrative purposes, other examples can involve more steps, fewer steps, different steps, or a different order of the steps depicted in FIG. 3. The steps of FIG. 3 are described below with reference to the components of FIGS. 1-2 described above.

At block 302, the processing device 202 can detect a modification to a first piece of contact data 108a of a user profile 106. The user profile 106 can be associated with a first user account 114a. In an example, the first user account 114a can be a deposit account associated with a financial institution. The user profile 106 can include contact data 108a-b (e.g., a prime phone number, a secondary phone number, an email, or the like) and personal data (e.g., name, home address, employer information, or the like) for a user 134 (e.g., an account holder) of the first user account 114a. In the example, the modification to the piece of contact data 108a detected by the processing device 202 can be an addition of a secondary phone number to the user profile 106.

At block 304, the processing device 202 can receive a resource request 132. The resource request 132 be a request for a transfer of data from the first user account 114a to a second user account 114b via a resource system 126a. The resource system 126a can be any system for performing data transfers between user accounts. In the example, the request can be for a resource transfer (e.g., a transfer of funds) from the deposit account belonging to the user 134 to another deposit account belonging to a second user via Zelle.

At block 306, the processing device 202 can determine that there has not been a previous transfer of data from the first user account 114a to the second user account 114b. In the example, the processing device 202 can access a database 122, which can include historical data 121 indicative of previous data transfers received or transmitted by the first user account 114a. The historical data 121 can include, for each data transfer, an account (e.g., a company or user account) which the data transfer was transmitted to or received from. The data in the database 122 can further include, for each data transfer, a resource system (e.g., Automated Clearing House, wire, etc.) through which the data transfer was performed. The data can also indicate an amount or type of that data that was transferred. Thus, based on the data in the database 122, the processing device 202 can determine that the first user account 114a has not transmitted data to or received data from the deposit account belonging to the second user.

At block 308, the processing device 202 can determine a first time 220a associated with the modification to the piece of contact data 108a and a second time 220b associated with the resource request 132. The processing device 202 can determine the first time 220a and the second time 220b in response to determining that there has not been a previous data transfer between the user accounts 114a-b. In the example, a first time stamp 118a can be recorded at the time of the modification to the piece of contact data 108a. Similarly, a second time stamp 118b can be recorded at the time the resource request 132 is received. Therefore, the processing device 202 can ascertain the first time 220a and the second time 220b based on the time stamps.

At block 310, the processing device 202 can compare a difference between the first time 220a and the second time 220b to a fraud prevention threshold 124. The fraud prevention threshold 124 can be a duration of time. For example, the fraud prevention threshold 124 can be forty-eight hours. In some examples, prior to comparing the difference, information associated with the modification to the first piece of contact data 108a (e.g., the type of contact data, a previous state of the piece of contact data, a new state of the piece contact data after modification, etc.) or associated with the resource request (e.g., an amount or type of data being requested for transfer) can be input into a machine learning model. The machine learning model can then output the fraud prevention threshold 124. The fraud prevention threshold 124 can be implemented to prevent data transfers from a user account to unknown accounts for a period of time after contact data in the user account has been modified. In this way, a risk of fraudulent or unauthorized data transfers from the user account can be minimized. In the example, the processing device 202 can determine that the difference between the first time 220a and the second time 220b is less than the fraud prevention threshold 124.

At block 312, the processing device 202 can generate an alert 130 comprising an indication of the modification to the first piece of contact data 108a transmit the alert 130 to a user device 110 associated with the first user account 114a. The alert can be transmitted using, for example, a second piece of contact data 108a that was not modified and that was in the user profile 106 before the modification to the first piece of contact data 108a. The alert can further prevent processing of the resource request 132 at the resource system 126a. Thus, the alert 130 can prevent execution of the transfer of data by the resource system 126a. The alert 130 can include an indication of the modification to the piece of contact data 108a, of the resource request 132, or a combination thereof. By preventing processing of the resource request 132 at the resource system 126a, the alert 130 can provide a mechanism for denying the resource request 132. The alert 130 can be transmitted in response to the processing device 202 determining that the difference between the second time 220b and the first time 220a was less than the fraud prevention threshold 124.

In one example, a user profile 106 can include contact data (e.g., a primary phone number, a secondary phone number, and an email address). The processing device 202 can detect a modification to the secondary phone number associated with the user profile 106. The modification can involve replacing the secondary phone number with another phone number. The user profile 106 can be associated with a first checking account. Subsequent to the modification to the secondary phone number, the processing device 202 can receive a resource request from a user device. The resource request can be a request to transfer funds from the first checking account to a second checking account via a digital payment network (e.g., Zelle). The processing device 202 can then access a database 122 with historical data regarding monetary transfers to and from the first checking account. Based on the historical data, the processing device 202 can determine that there has not been a previous monetary transfer between the first checking account and the second checking account. In response to determining that there has not been a previous monetary transfer, the processing device 202 can access a first time stamp at which the modification to the secondary phone number occurred. The processing device 202 can further analyze the resource request to derive a second time stamp corresponding to the initiation of the resource request by the user device. The processing device 202 can then determine a duration of time between the first time stamp and the second time stamp and can compare the duration of time to a fraud prevention threshold of seventy two hours. Based on the duration of time being greater than seventy-two hours, the processing device 202 can generate an alert with an indication of the change to the secondary phone number. The processing device 202 can transmit the alert to the primary phone number and email address, which were not modified and which were in the user profile prior to the modification to the secondary phone number. The transmission of the alert can further be detected by the digital payment network. Based on detecting the alert, the digital payment network may not transfer the funds from the first checking account to the second checking account. Thus, the alert can prevent execution of the transfer of funds at the digital payment network.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
 a processing device; and
 a memory device that includes instructions executable by the processing device for causing the processing device to perform operations comprising:
  receiving an enrollment request from a user device, the enrollment request being a request to enroll a first user account in a resource system;
  in response to receiving the enrollment request, requesting a mobile communication from a first piece of contact data of a user profile associated with the first user account;
  upon receiving the mobile communication, verifying a user of the first user account and automatically enrolling the first user account in the resource system, wherein enrolling the first user account in the resource system provides access for the first user account to the resource system;
  subsequent to enrolling the first user account in the resource system, monitoring the user profile to detect a modification to the first piece of contact data in the user profile; and
  upon detecting the modification to the first piece of contact data, preventing the access for the first user account to the resource system for a period of time, wherein the preventing the access for the first user account to the resource system for the period of time comprises:
   receiving a resource request, the resource request being a request for a transfer of data from the first user account to a second user account via the resource system;
   determining, based on historical data associated with the first user account, that there has not been a previous transfer of data between the first user account and the second user account; and
   in response to determining that there has not been a previous transfer of data between the first user account and the second user account:
    determining a first time associated with the modification to the first piece of contact data and a second time associated with the resource request;
    comparing a difference between the first time and the second time to the period of time; and
    in response to the difference between the first time and the second time being less than the period of time, preventing access for the first user account to the resource system, generating an alert comprising an indication of the modification to the first piece of contact data, and transmitting the alert to the user device, wherein the alert is transmitted using a second piece of contact data that was in the user profile before the modification to the first piece of contact data.

2. The system of claim 1, wherein the operation of requesting the mobile communication involves transmitting a security code to the user device and transmitting a request for the security code to the first piece of contact data.

3. The system of claim 2, wherein the operation of verifying the user of the first user account involves receiving the security code in the mobile communication from the first piece of contact data.

4. The system of claim 1, wherein the operations further comprise, subsequent to enrolling the first user account in the resource system:
 detecting a closure of the first user account; and
 in response detecting the closure of the first user account, automatically unenrolling the first user account from the resource system.

5. The system of claim 4, wherein the operations further comprise transmitting an alert including an indication of the unenrollment of the first user account from the resource system to the user device.

6. The system of claim 1, wherein the operation of preventing access for the first user account to the resource system for the period of time further comprises:
 in response to the difference between the first time and the second time being greater than the period of time, generating an alert including an indication of approval of the resource request and transmitting the alert to the user device associated with the first user account, wherein alert causes execution of the transfer of data at the resource system.

7. A computer-implemented method comprising:
 receiving an enrollment request from a user device, the enrollment request being a request to enroll a first user account in a resource system;
 in response to receiving the enrollment request, requesting a mobile communication from a first piece of contact data of a user profile associated with the first user account;
 upon receiving the mobile communication, verifying a user of the first user account and automatically enrolling the first user account in the resource system, wherein enrolling the first user account in the resource system provides access for the first user account to the resource system;
 subsequent to enrolling the first user account in the resource system, monitoring the user profile to detect a modification to the first piece of contact data in the user profile; and upon detecting the modification to the first piece of contact data, preventing the access for the first user account to the resource system for a period of time, wherein the preventing the access for the first user account to the resource system for the period of time comprises:

receiving a resource request, the resource request being a request for a transfer of data from the first user account to a second user account via the resource system;

determining, based on historical data associated with the first user account, that there has not been a previous transfer of data between the first user account and the second user account; and in response to determining that there has not been a previous transfer of data between the first user account and the second user account:

determining a first time associated with the modification to the first piece of contact data and a second time associated with the resource request;

comparing a difference between the first time and the second time to the period of time; and in response to the difference between the first time and the second time being less than the period of time, preventing access for the first user account to the resource system, generating an alert comprising an indication of the modification to the first piece of contact data, and transmitting the alert to the user device, wherein the alert is transmitted using a second piece of contact data that was in the user profile before the modification to the first piece of contact data.

8. The computer-implemented method of claim 7, wherein requesting the mobile communication involves transmitting a security code to the user device and transmitting a request for the security code to the first piece of contact data.

9. The computer-implemented method of claim 8, wherein verifying the user of the first user account involves receiving the security code in the mobile communication from the first piece of contact data.

10. The computer-implemented method of claim 7, further comprising, subsequent to enrolling the first user account in the resource system:

detecting a closure of the first user account; and in response detecting the closure of the first user account, automatically unenrolling the first user account from the resource system.

11. The computer-implemented method of claim 10, further comprising transmitting an alert including an indication of the unenrollment of the first user account from the resource system to the user device.

12. The computer-implemented method of claim 7, preventing access for the first user account to the resource system for the period of time further comprises:

in response to the difference between the first time and the second time being greater than the period of time, generating an alert including an indication of approval of the resource request and transmitting the alert to the user device associated with the first user account, wherein alert causes execution of the transfer of data at the resource system.

13. A non-transitory computer-readable medium comprising instructions that are executable by a processing device for causing the processing device to perform operations comprising:

receiving an enrollment request from a user device, the enrollment request being a request to enroll a first user account in a resource system;

in response to receiving the enrollment request, requesting a mobile communication from a first piece of contact data of a user profile associated with the first user account;

upon receiving the mobile communication, verifying a user of the first user account and automatically enrolling the first user account in the resource system, wherein enrolling the first user account in the resource system provides access for the first user account to the resource system;

subsequent to enrolling the first user account in the resource system, monitoring the user profile to detect a modification to the first piece of contact data in the user profile; and upon detecting the modification to the first piece of contact data, preventing the access for the first user account to the resource system for a period of time, wherein the preventing the access for the first user account to the resource system for the period of time comprises:

receiving a resource request, the resource request being a request for a transfer of data from the first user account to a second user account via the resource system;

determining, based on historical data associated with the first user account, that there has not been a previous transfer of data between the first user account and the second user account; and in response to determining that there has not been a previous transfer of data between the first user account and the second user account:

determining a first time associated with the modification to the first piece of contact data and a second time associated with the resource request;

comparing a difference between the first time and the second time to the period of time; and in response to the difference between the first time and the second time being less than the period of time, preventing access for the first user account to the resource system, generating an alert comprising an indication of the modification to the first piece of contact data, and transmitting the alert to the user device, wherein the alert is transmitted using a second piece of contact data that was in the user profile before the modification to the first piece of contact data.

14. The non-transitory computer-readable medium of claim 13, wherein the operation of requesting the mobile communication involves transmitting a security code to the user device and transmitting a request for the security code to the first piece of contact data.

15. The non-transitory computer-readable medium of claim 14, wherein the operation of verifying the user of the first user account involves receiving the security code in the mobile communication from the first piece of contact data.

16. The non-transitory computer-readable medium of claim 13, wherein the operations further comprise, subsequent to enrolling the first user account in the resource system:

detecting a closure of the first user account; and in response detecting the closure of the first user account, automatically unenrolling the first user account from the resource system.

17. The non-transitory computer-readable medium of claim 16, wherein the operations further comprise transmitting an alert including an indication of the unenrollment of the first user account from the resource system to the user device.

\* \* \* \* \*